UNITED STATES PATENT OFFICE.

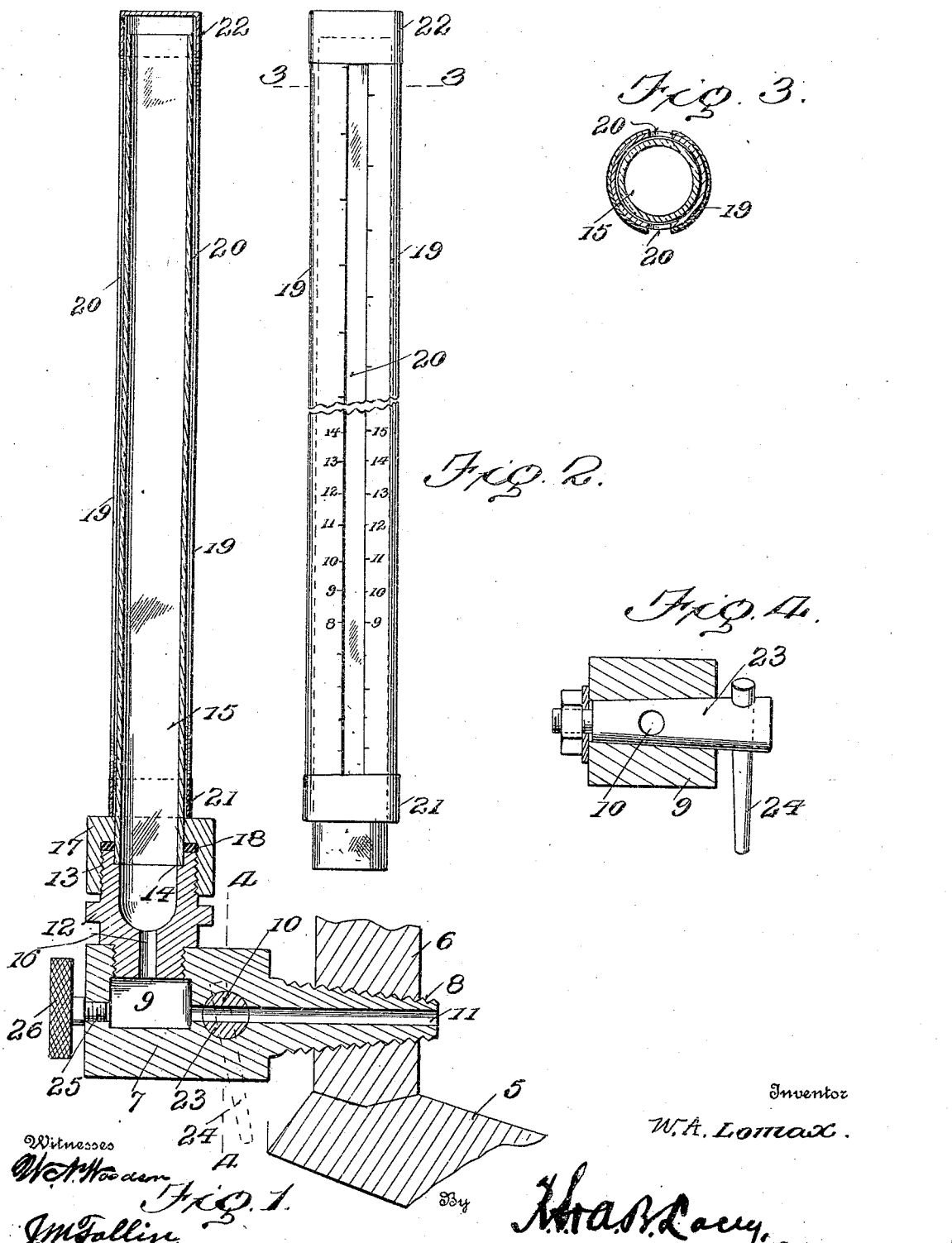

WILLIAM A. LOMAX, OF KEARNEY, NEBRASKA.

GAGE.

955,175.

Specification of Letters Patent. Patented Apr. 19, 1910.

Application filed March 19, 1909. Serial No. 484,393.

*To all whom it may concern:*

Be it known that I, WILLIAM A. LOMAX, a citizen of the United States, residing at Kearney, in the county of Buffalo and State of Nebraska, have invented certain new and useful Improvements in Gages, of which the following is a specification.

This invention relates to gages and more particularly to a gage for determining the quantity of liquid in barrels, kegs and similar containing vessels.

The object of the invention is to provide a sight tube for attachment to the head or other portion of a liquid containing vessel and having a port forming a source of communication between said tube and the interior of the vessel, there being a graduated scale mounted on the tube and extending the entire height thereof so that by simply glancing at the scale the operator may determine the exact quantity of liquid in the vessel.

A further object is to provide means for controlling the flow of liquid from the vessel to the sight tube, and means for draining the latter when the controlling valve is in closed position.

A still further object of the invention is generally to improve this class of devices so as to increase their utility, durability, and efficiency.

Further objects and advantages will appear in the following description, it being understood that various changes in form, proportions, and minor details of construction may be resorted to within the scope of the appended claims.

For a full understanding of the invention and the merits thereof and also to acquire a knowledge of the details of construction and the means for effecting the result, reference is to be had to the following description and accompanying drawings, in which:

Figure 1 is a longitudinal sectional view of a gage constructed in accordance with my invention, showing the same applied to the head of a barrel; Fig. 2 is a front elevation of the tube detached showing the rotary scale carrying member in position thereon; Fig. 3 is a transverse sectional view taken on the line 3—3 of Fig. 2; Fig. 4 is a transverse sectional view taken on the line 4—4 of Fig. 1.

Corresponding and like parts are referred to in the following description and indicated in all the views of the drawings by the same reference characters.

The improved sight tube or gage forming the subject matter of the present invention is principally designed for attachment to barrels, kegs and similar liquid containing vessels, and by way of illustration is shown in connection with a barrel of the ordinary construction, in which 5 designates the body of the barrel, and 6 the head thereof.

The device comprises a casing 7 of any desired cross sectional formation having its rear end reduced to form a threaded shank adapted to be screwed into the adjacent head of the barrel. The casing 7 is provided with an interior chamber or compartment 9 and a port 10 through which the liquid from the barrel is admitted to the chamber 9, the shank 8 being provided with a longitudinally disposed passage 11 to permit the entrance of liquid through the port.

Threaded in the upper end of the casing 7, is a nipple 12 having its exterior walls threaded at 13 and its lower end reduced and threaded exteriorly for engagement with a correspondingly threaded opening formed in the top of the casing 7, there being a shoulder 14 formed on the interior wall of the nipple and adapted to receive and support the sight glass or tube, indicated at 15. The nipple 12 is provided with a vertical opening 16 forming a source of communication between the interior of the tube 15 and the chamber 9 so that the liquid entering the chamber 9 from the interior of the barrel, will rise within the tube 15 to the same level as the liquid in the barrel. The tube 15 is retained in position on the nipple 12 by a clamping nut 17 engaging the exterior threads 13 of the nipple 12, there being a washer or packing 18 interposed between the clamping nut 17 and nipple 12 in order to prevent leakage.

Surrounding the tube 15 and mounted for rotation on the clamping nut 17, is a tubular member 19 preferably formed in two sections having their adjacent longitudinal edges spaced apart to produce oppositely disposed slots 20 so as to permit the operator to readily see the liquid in the tube 15. The sections of the tubular member 19 are rigidly united by oppositely disposed caps 21 and 22, the lower end of one of which is open and bears against the adjacent upper surface of the clamping nut 17, while the upper end of the cap 22 is closed and forms a closure for the adjacent end of the tube 15 thereby to prevent the entrance of dirt and other foreign matter to the liquid in said tube.

Stamped, printed, or otherwise represented on the sections 19 of the tubular member, are a plurality of scales, preferably four in number and graduated to indicate quarts, gallons, or other measurements, one of the scales being arranged adjacent each slot 20 so that as the level of the liquid in the barrel rises or falls, the height of the liquid in the tube 15 will correspondingly vary and the exact quantity of liquid in the barrel may be ascertained by reference to the scales. The scales are graduated to indicate the capacity of barrels or vessels of different sizes so that by rotating the tubular member 19 on the clamping nut 17, the capacity of different receptacles may be readily ascertained.

As a means for controlling the flow of liquid from the interior of the barrel to the chamber 9, there is provided a valve 23 having a port formed therein adapted to register with the passage 11 when turned in one direction, and cut off the flow of liquid through said passage when the valve is turned in the opposite direction, a suitable handle or lever 24 being provided to facilitate turning the valve.

Formed in the forward end of the casing 7 is a threaded opening 25 which receives a correspondingly threaded plug 26, by removing which, the contents of the tube 15 may be drained when it is desired to clean the latter or remove the tube to effect any necessary repairs thereto. Thus it will be seen that by manipulating the valve 23, the flow of liquid to the interior of the tube 15 may be controlled, while by removing the plug 26, when said valve is closed, the contents of the tube 15 may be removed without liability of the liquid in the barrel escaping through the passage in the threaded end of the casing.

Having thus described the invention, what is claimed as new is:

1. The combination with a liquid containing vessel, of a sight tube, means connecting the sight tube with the interior of the vessel, a graduated tubular member mounted for rotation on the sight tube and formed of a plurality of sections spaced apart to produce longitudinally disposed slots, and terminal heads connecting said sections, one of which forms a closure for the upper end of the tube.

2. The combination with a liquid containing vessel, of a casing having a shank extended through a wall of the vessel and provided with a passage, a nipple carried by the casing, a sight tube seated in said nipple and communicating with the passage, a valve operating within the casing for controlling the flow of fluid from the vessel to the sight tube, a removable plug carried by the casing for draining the contents of the tube when the valve is closed, a graduated tubular member mounted for rotation on said sight tube and formed of a plurality of sections spaced apart to produce longitudinally disposed slots, and terminal heads connecting said sections, one of which forms a closure for the upper end of the tube.

In testimony whereof I affix my signature in presence of two witnesses.

WILLIAM A. LOMAX. [L. S.]

Witnesses:
J. F. CROCKER,
J. G. LEU.